United States Patent

[11] 3,618,671

| [72] | Inventor | Alfred Chantland<br>Humboldt, Iowa 50548 |
|---|---|---|
| [21] | Appl. No. | 874,156 |
| [22] | Filed | Nov. 5, 1969 |
| [45] | Patented | Nov. 9, 1971 |

[54] GRADER ATTACHMENT FOR A TRACTOR
4 Claims, 7 Drawing Figs.

[52] U.S. Cl.................................................. 172/297,
172/788, 172/705
[51] Int. Cl..................................................... A01b 59/04,
E02f 3/12
[50] Field of Search........................................... 172/297,
273, 794, 803, 804, 807, 225, 801, 666, 788, 781,
668, 705

[56] References Cited
UNITED STATES PATENTS
| 2,624,962 | 1/1953 | Evans.......................... | 172/788 |
| 2,883,776 | 4/1959 | Orscheln..................... | 172/273 X |
| 2,979,839 | 4/1961 | Hugger........................ | 172/801 |
| 3,007,266 | 11/1961 | Brand........................... | 172/273 X |
| 3,141,250 | 7/1964 | Eddins......................... | 172/794 X |
| 3,381,760 | 5/1968 | Brand........................... | 172/788 |
| 3,428,135 | 2/1969 | Richey......................... | 172/225 |

*Primary Examiner*—Robert E. Pulfrey
*Assistant Examiner*—Stephen C. Pellegrino
*Attorney*—Rudolph L. Lowell

ABSTRACT: The grader blade of the attachment is located between the tractor front and rear wheels and is carried on a frame supported on the tractor rear axle for pivotal up-and-down movement by the tractor power lift arms. The grader blade is adjustably mounted on the frame for adjustable rotational movements about a vertical axis and a horizontal axis that extends longitudinally of the tractor.

INVENTOR.
ALFRED CHANTLAND
BY Rudolph P. Durrell
ATTORNEY.

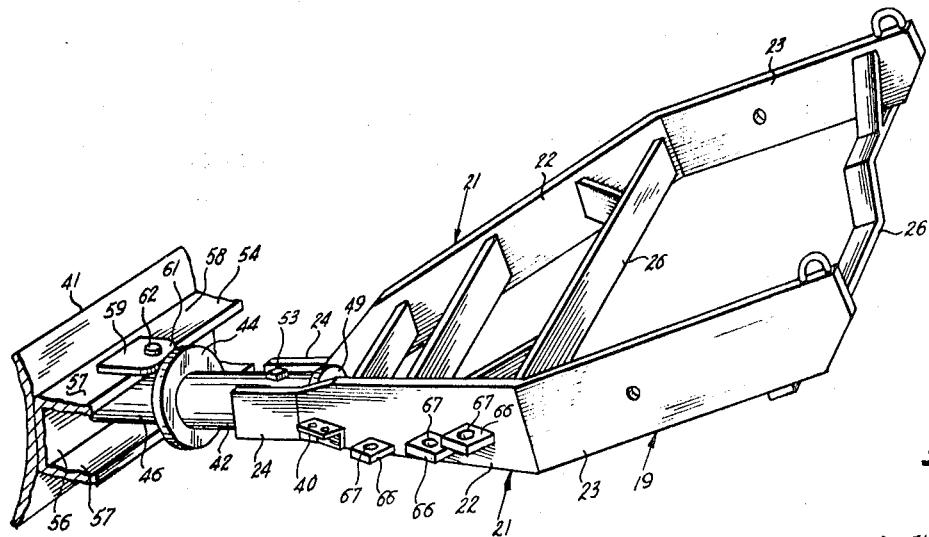
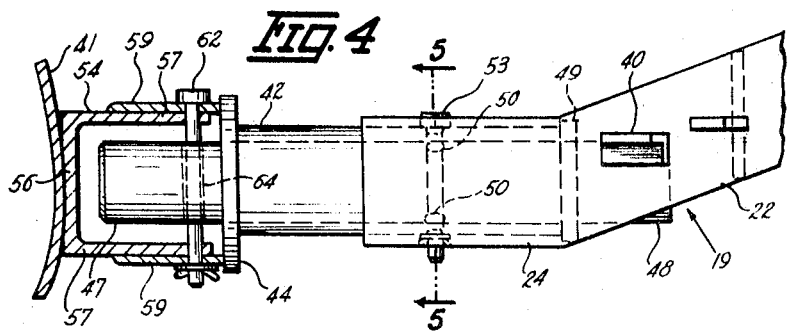
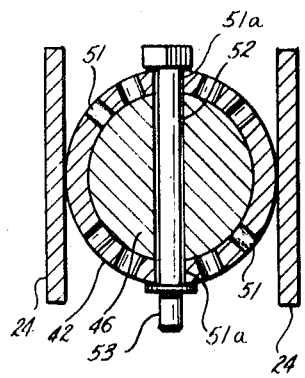
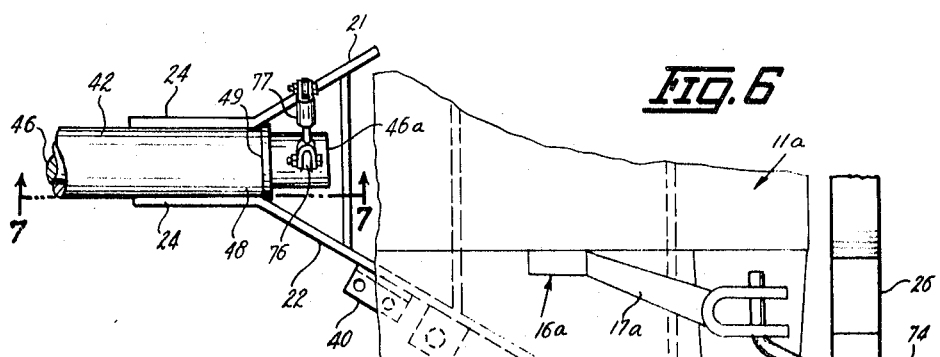
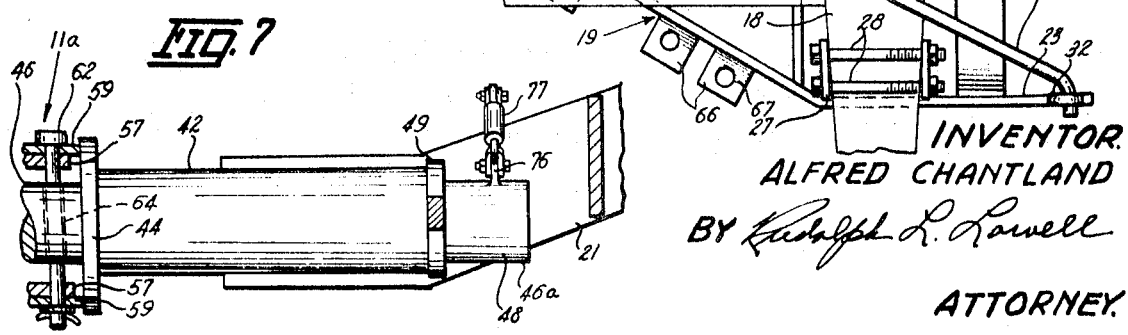

3,618,671

GRADER ATTACHMENT FOR A TRACTOR

SUMMARY OF THE INVENTION

The grader attachment is compact and light in weight and easily handled by one man for assembly with and removal from the tractor in a minimum of time. The tractor-working time is thus conserved to provide for its periodic use to efficiently maintain the farm driveway and field roads. The attachment is powered directly from the usual tractor lift arm devices that form part of a conventional three-point hitch. The action of the grader blade is readily observed by the tractor operator by merely looking forwardly and downwardly from a normal driving position. Also the simple blade adjustments provide for a working on roads having different ground or soil characteristics and varying surface contours.

BRIEF DESCRIPTION OF THE DRAWINGS

FIG. 3 is a top perspective view of the grader attachment;

FIG. 4 is an enlarged elevational view of the front portion of the grader attachment with the blade shown in section;

FIG. 5 is an enlarged sectional view on line 5—5 in FIG. 4;

FIG. 6 is a modified form of the attachment; and

FIG. 7 is an enlarged sectional view taken along the line 7—7 in FIG. 6.

DETAILED DESCRIPTION OF THE INVENTION

Figures 1, 2:
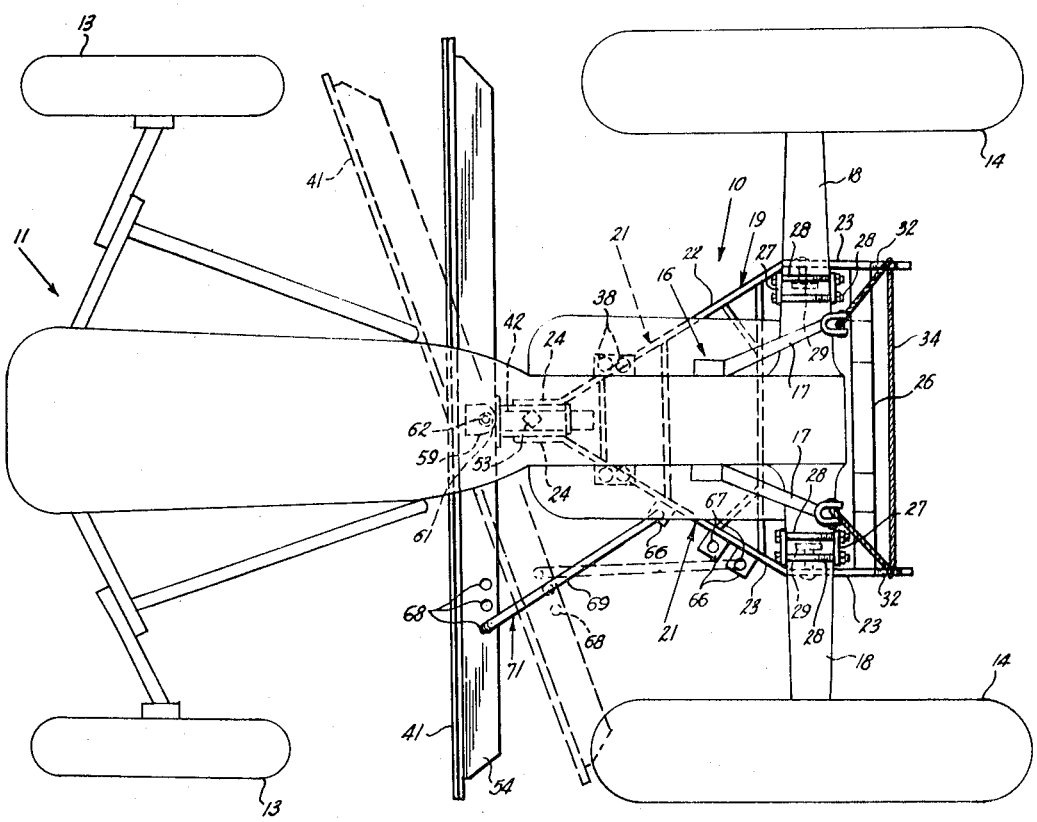
FIG. 1 is a top plan view of a tractor showing the assembly therewith of the grader attachment of this invention.
FIG. 2 is a side elevational view of the assembly shown in FIG. 1 with some parts broken away and other parts shown in section for the purpose of clarity.

Referring to FIGS. 1 and 2 of the drawings, the grader attachment of this invention, indicated generally as 10, is shown in assembly relation with a conventional farm tractor 11 that has a frame, designated generally as 12, provided with front wheels 13 and rear wheels 14. The tractor is equipped with a power lift mechanism of a usual type, indicated generally at 16, that is powered from the tractor engine (not shown) and includes a pair of transversely spaced lift arms 17 that project rearwardly above the tractor axle 18.

The grader attachment 10 includes a frame structure 19 (FIGS. 1 and 3) of a generally A-shape including side frame members 21 that have forwardly converged body sections 22 with linear rearward sections 23 and offset forward sections 24. The body sections 22 and rear sections 23 are interconnected by transverse brace members 26.

The frame structure 19 (FIG. 2) is pivotally supported from the tractor rear axle 18 for location below the tractor frame 12 by means including a pair of mounting brackets 27 secured at axially spaced positions on the rear axle 18 as by clamping bolts 28 and having depending arms 29. A pivot shaft 31 carried in the lower ends of the arms 29 extends through the rear sections 23 adjacent their junction with the body sections 22, to provide for a pivotal seesaw action of the frame structure 19. The rear sections or extensions 23 thus project rearwardly of the axle 18 and the body sections 22 of the frame members 21 are of a length to position the front sections 24 forwardly of the tractor rear wheels 14.

The rear sections 23 are arranged between the mounting bracket arms 29 and in contact engagement therewith so as to limit movement of the frame structure 19 axially of the pivot shaft 31. As clearly appears in FIG. 2, when the body sections 22 are inclined forwardly and downwardly from the pivot shaft 31 the rear sections 23 are inclined upwardly and rearwardly from the pivot shaft 31 and the offset front sections 24 are in substantially horizontal positions.

For use of the grader attachment 10 on farm tractors 11 having power lift mechanisms wherein the lift arms 17 are power operated in an upward direction and then moved downward to a rest or normal position by gravity or like action, the upper surfaces of the rear sections 23 are provided with loops or eye members 32. With one end 33 of a cable 34 secured to a first lift arm 17, the cable is extended in succession through the eye members 32 for the securement of its other end 36 to the second lift arm 17. On upward movement of the lift arms 17 the frame structure 19 is power actuated about the pivot 31 to move the front sections 24 toward the ground surface, indicated at 37 in FIG. 2.

On the release of the power to the lift arms 17 the front sections 24 are moved away from the ground surface 37 by pairs of upright coil springs 38 corresponding to each frame member 21 and acting to continuously pull the front sections 24 in an upward direction. Each pair of springs 38 has an upper end adjustably secured at 39 to the tractor frame 12 and a lower end attached to a mounting plate 40 secured to the front end of an adjacent body section 22. The tension of the springs 38 is adjusted relative to the cable 34 so that when the lift arms 17 are in their neutral or down positions, the grader blade 41 is in a transport position above the ground surface 37.

As shown in FIGS. 3 and 4 the blade 41 is of a concavo-convex shape in transverse section with the concave side faced forwardly and with the blade extended transversely of the tractor 11 at a position forwardly of the rear wheels 14. The blade 41 is adjustably supported for rotational movement about a horizontal axis extended longitudinally of the tractor, and for a pivoting or tilting movement fore-and-aft of the tractor by means including a tubular bearing member 42 that is positioned between and secured, as by weldments, to the inner or facing surfaces of the front sections 24. The bearing member 42 has a section 43 projected forwardly of the front sections 24 and in turn from the frame structure 19. A laterally projected annular collar or flange 44 is provided about the front end of the bearing forward extension 43 for a purpose to appear later.

Rotatably mounted in the tubular bearing 42 is a shaft 46 that has front and rear sections 47 and 48 projected rearwardly from the front and rear ends of the bearing member 42, all respectively. A stop collar 49 on the rear shaft section 48 limits the forward movement of the shaft axially of the bearing member 42.

To lock the shaft 46 in an adjusted rotated position relative to the bearing member 42, the bearing member is formed in opposite side portions thereof with circumferentially spaced diametrically opposite pairs of openings 51 (FIG. 5). The shaft 46 is formed with a single diametrically extended opening 52, which on rotation of the shaft 46 is movable into alignment with a selected pair of the openings 51 to define an adjusted rotated position of the shaft 46. The shaft is then locked in its adjusted position by the insertion of a pin 53 through the selected pair of openings 51 and the opening 52. When the pair of openings indicated at 51a are in alignment with the shaft opening 52 the grader blade 41 is extended horizontally transversely of the tractor 11.

The blade 41 is supported on the shaft front section 47 for pivotal movement about an axis extended transversely of the shaft 46 by means including an elongated backing member 54 for the grader blade 41 (FIGS. 3 and 4). The backing member 54 is of a U-shape in transverse cross section having a base section 56 secured as be weldments to the rear side of the blade 41 so that the leg sections 57 project rearwardly from the blade 41 in a vertically spaced relation. The central portion 58 of the backing member 54 functions as a connector member for attachment to the shaft front section 47. At the central portion 58 each of the leg sections 57 has secured to its outer surface an abutment plate 59 that has a rear edge 61 of an arcuate shape spaced rearwardly from the rear edge of a corresponding leg section 57. The curvature of each rear edge 61 is generated on a radius that has a center coincident with the axis of a connecting or pivot pin 62 that is received through aligned holes formed in the abutment plate 59 and leg sections 57 and a hole 64 extended diametrically of the shaft front section 47 when the leg sections 57 are in a straddling relation with the shaft front section 47.

With the stop collar 49 against the rear end of the tubular member 42 and the shaft 46 is connected with the blade backing member 54 the rear edge 61 of each abutment blade 59 is in contact engagement with the flange 44 at all pivotally adjusted positions of the blade about the pivot pin 62. To hold the blade 41 in an adjusted position relative to the pivot pin 62 the frame side member indicated as 21a (FIGS. 1 and 2) is provided with forwardly projected ears 66 which are spaced in a predetermined relation longitudinally of the corresponding body section 22. Each ear 66 has a vertically extended opening 67. The upper one of the leg sections 57 of the backing member 54 over the portion thereof positioned forwardly of the frame member 21a is formed with a series of longitudinally spaced openings 68 corresponding to the openings 67 on the frame member 21a. A lock rod 69 of a generally inverted U-shape (FIGS. 1 and 2) has an elongated base 71 and leg sections 72 and 73. By inserting the leg section 72 in one of the openings 67 and the leg section 73 in one of the openings 68 the blade is held in an adjusted position relative to the pivot 62 through an angular displacement of about 20° to each side of a position extended transversely of the tractor 11.

The modified form of the invention shown in FIGS. 6 and 7 is the same in all respects as that described in connection with FIGS. 1 and 2 except for the operation of the lift arms 17a and the adjustment of the grader blade 41 about its horizontal axis. Similar numerals therefore, will be used to designate like parts. In the modified form, the tractor 11a is equipped with a power lift mechanism 16a in which the lift arms 17a are power actuated in both upward and downward directions. The lift arms are connected with the eye members 32 on the rear sections 23 by the lift links 74 and the coil springs 38 of FIG. 2 are removed. The frame structure 19 is thus pivotally movable at all times in direct response to the power actuation of the lift arms 17a.

To adjust and hold the shaft 46 in a rotated position the shaft rear section 48 is provided with a rock arm 76. Extended between and connected to the rock arm 76 and one of the side frame members 21 is a hydraulic cylinder assembly 77 of the double-acting type and operable in a usual manner from the hydraulic system with which the tractor 11a is equipped. The grader attachment 10a of FIGS. 6 and 7 is thus entirely power operated for the manual adjustment of the blade 41 relative to the pivot 62.

I claim:

1. A grader attachment for a tractor having a main frame, a rear axle, front and rear wheels, and a power operated lift means projected rearwardly of said axle, comprising:
   a. a frame structure located below said axle and extended longitudinally of the tractor,
   b. means pivotally supporting the frame structure intermediate the ends thereof from said axle, for up-and-down pivotal movement,
   c. means connecting the rear end portion of the frame structure with said lift means to pivotally move said frame structure said tractor lift means being powered in one direction to pivotally move the front end portion of the frame structure in a downward direction,
   d. a grader blade extended transversely of and below the tractor frame between the tractor front and rear wheels,
   e. means supporting said blade at the front end portion of said frame structure for adjustable rotational movements about a horizontal axis extended longitudinally of the tractor frame and an upright axis extended through said horizontal axis,
   f. a first means on said frame structure for locking said grader blade in an adjusted rotated position relative to said horizontal axis, and
   g. a second means extended between and connected to said grader blade and frame structure for locking said grader blade in an adjusted rotated position relative to said vertical axis,
   h. said blade in an adjusted position being pivotally movable with said frame structure on actuation of said lift means, and spring means extended between and connected to said tractor frame ans the front end portion of the frame structure to continuously urge said front end portion in an upward direction.

2. The grader attachment for a tractor according to claim 1 wherein:
   a. said blade-supporting means includes a tubular bearing member secured to the front end portion of said frame structure and extended longitudinally thereof,
   b. a shaft member rotatable within said bearing member having a front section projected forwardly of said bearing member and a rear section extended rearwardly from the bearing member,
   c. a rocker arm secured to said rear section,
   d. a linearly movable power means extended between and connected to said rocker arm and the front portion of the frame structure for moving and holding said shaft in a rotated position,
   e. a pivot means on the front section of said shaft supporting said grader blade for pivotal movement about an axis transverse of said shaft, and
   f. means for holding said blade in a pivotally moved position relative to said transverse axis.

3. The grader attachment for a tractor according to claim 1 wherein:
   a. said blade-supporting means includes a rotatable shaft extended longitudinally of the frame structure and rotatably supported at the front end thereof, said shaft having a front section projected forwardly of said frame structure,
   b. a connector unit secured to and projected rearwardly from the blade intermediate the ends thereof including a pair of vertically spaced members arranged in a straddling relation with the front section of said shaft,
   c. means pivotally connecting said front shaft section and vertically spaced members for pivotal movement of the blade about an axis transverse of said shaft,
   d. coacting engageable means on said connector unit and frame structure for directly transmitting independently of said pivotal connecting means, a force applied rearwardly on said blade to said frame structure at all pivotally moved positions of said blade, and
   e. means for holding said blade in a pivotally moved position.

4. The grader attachment according to claim 1 wherein:
   a. said frame structure includes a pair of forwardly diverged side frame members,
   b. said means for holding the blade in a pivotally moved position including an adjustable arm member of a generally inverted U-shape having an elongated base section and a front leg section and a rear leg section,
   c. one of said frame members having a series of longitudinally spaced openings, and
   d. said blade having the portion thereof located forwardly of said one frame member formed with a series of longitudinally spaced openings corresponding to the openings in said front member,
   e. each leg section of the arm member selectively received in a corresponding selected one of said longitudinally spaced openings to define a pivotally moved position of said blade.

* * * * *